Patented Jan. 1, 1929.

1,696,899

UNITED STATES PATENT OFFICE.

CELSO PIETRO BACCOVICH, OF GENOA, ITALY.

CEMENT.

No Drawing. Application filed February 16, 1924, Serial No. 693,352, and in Japan March 28, 1923.

This invention relates to cement, and involves not only the cement composition, powder or mixture, but also the mortars, concretes and other products thereof, and the processes involved. I have made applications for patent on this invention in Japan, No. 12,402, filed March 28, 1923, the benefit of which date I herein claim.

The invention is useful for various purposes, wherever hydraulic cements are used, for example, for marine or submarine construction work, for which this invention is especially advantageous. The invention may be considered as a quartz cement, by which is intended a cement having a high percentage of silica, contained in all the quartz rocks.

The general object of the present invention is to afford a superior cement for the purposes mentioned, or other purposes, and especially a hydraulic cement having extreme denseness and powers of coherence and adherence. A particular object is to afford a cement having great durability and strength to withstand shock, pressure and general wear and tear. Another object is to afford maximum waterproof qualities, and resistance to corrosion. Another object is to increase and prolong the hardening action far beyond that of ordinary cements, resulting in an exceedingly hard and vitreous product, with all the advantages of the hardest natural stone. A further object is a reduction in the cost of high quality cements. Other objects and advantages will be explained in the hereinafter following description or will be apparent to those skilled in the subject.

To the attainment of the aforesaid objects and advantages the present invention consists in the novel cement, method of producing the same, and the products thereof, as hereinafter more fully described and claimed.

This new cement may be obtained, for example, by mixing in a very intimate and homogeneous mixture, a slow setting Portland cement together with the powder produced by crushing and pulverizing crystalline acidic rocks rich in alkalis. Examples of such rocks are the following: porphyryies, svenites, granulites, granites, pegmatites. These and others that may be used may be described as quartziferous rocks.

Ordinary crushing and pulverizing does not give sufficient fineness for best results with this invention, and it is preferred to bring about an increased fineness, adapted to enable an almost intermolecular mixture, through the use of special super-pulverizing apparatuses. The rock elements may be crushed together with Portland cement material or clinker to give the mixture directly, or the powdered rock may be first produced and then mixed with Portland cement by means of tube mills or other apparatus adapted to afford the greatest intimacy of mixture.

The purpose of the super-grinding of the rock elements is that certain components may be as soluble as possible, an important consideration to secure perfect reactions during the hydration of the cement. The rock ingredients should be reduced to a completely impalpable powder. A character of special pulverizing apparatus or tube mill should be used having at least three times greater degree of reduction than is generally required in the ordinary grinding of clinkers or other cement ingredients. By this means the desired high solubility of the quartziferous, feldspathic and micaceous elements of the rock is obtainable.

With the present invention it is preferred that the degree of fineness of pulverization be enhanced by a preliminary drying operation. The rock ingredients, after being crushed to the fineness of fairly coarse grains of sand, are preferably dried by means of a thermo-mechanical drying apparatus, such as devices heretofore used for drying clays, namely, at temperatures varying from 200° C. to 500° C. according to the hygrometric character of the rock. This enables the subsequent pulverizing operations to give the desired fineness of product.

The principle underlying the matter of solubility and its advantages, is believed to be substantially as follows. All acidic rock generally comprises quartz and feldspar as well as mica. These elements are very rich in pure silica, while the feldspar and mica contain a substantial amount of alkaline content. Now these ingredients, reduced to an impalpable powder, and homogenously mixed with the cement powder, afford a very advantageous reaction, since at the moment of hydration they have a very strong mutual attraction. The rock elements, reduced as stated to a fineness at least three times superior to that of the cement powder, are effectively caused, by colloidal action, to fill completely the minute interstices existing between the particles of cement. This practically molecular contact affords to the utmost degree a complete reaction. Both the high degree of pulverization, and the alkaline composition, of the rock elements are important, and due to these the combining reactions are greatly favored. The lime which is freed during the setting action becomes fixed. All excess of silica is transformed into gelatinous silica, and this latter product contributes a self-vitrifying action such as to extremely improve the quality of the set cement, and subsequent hardening thereof.

With the usual cement the maximum resistance is attained in a period of about three months, after which the hardening process ceases and the condition remains practically stationary. With the present invention on the contrary, owing to the chemical reactions which continue to take place within the mass, the resistance steadily increases, even beyond the three months' period. This continues indefinitely, resulting in the transformation of the cement into an exceedingly hard, compact and durable product of a vitreous nature possessing very largely the characteristics, and all of the advantages, of the best natural stone.

It has been above mentioned that slow setting Portland cement is preferred. This is an important consideration in order to insure that the described reactions are fully accomplished. Such slow setting cement may be one having a ratio between the silica and alumina of 3.5 parts of silica to 1 part of alumina. Too great a percentage of alumina, on account of its quick setting qualities, renders it unsuitable for obtaining the best results.

With regard to the proportions, in my cement mixture, of the rock elements and the Portland cement, these should be varied in accordance with the chemical and mineralogical composition of the particular rock element employed, determined by previous analysis. Generally speaking if the rock elements are about 25% of the quantity of cement employed, the lime freed during the setting action may be almost completely fixed by the silica present. In order, however, to obtain, at the moment of hydration, an acid reaction, which is of great importance, the proportion of the rock elements must be increased to about 40%, more or less, of the quantity of cement used. In some cases the proportions should be still higher. Thus if rocks are employed with an especially high degree of alkaline contents the proportion may be raised as high as 50% or slightly higher. This would be the case with certain kinds of granites rich in feldspar, such as orthoclase ($4SiO_2$, $KO_2$, $2SiO_2$, $Al_2O_3$), or rich in white mica, such as muscovite ($6SiO_2$, $3Al_2O_3$, $K_2O$, $H_2O$).

When the above described procedure is carefully followed a cement is obtained which affords high qualities of compactness, density and resistance, with maximum waterproof qualities and power of adhesion twice or more times that of ordinary hydraulic cements.

The quartz cement of this invention, if carefully employed, is capable of producing a concrete or artificial stone decidedly superior to products made with Portland cement. It will be capable of withstanding the various shocks that occur in practical use, and the crushing pressures sometimes applied to masonry, and general wear and tear. This quartz cement or concrete moreover possesses an important advantage in a most unusually effective resistance to the chemical action of the destructive salts contained in sea-water, including sulphate of magnesium, which are the principal causes of decomposition of mortars made from Portland cement used in marine work. The present product becomes hardened and vitrified into a condition showing a glassy surface, due to the abundant presence of gelatinous silica, and affording the described protection against corrosion. This quality further assures resistance to corrosion by many weak acids, rendering it highly useful for many purposes where concretes or betons made with ordinary Portland cement would disintegrate in a short time.

The cost of manufacture of the cement of this invention is low for the reason that about 25% to 50%, more or less, consists of raw materials which do not require calcination.

It will thus be seen that I have described a hydraulic cement or quartz cement, the process of manufacturing the same, the mode of employing the same, and the resulting products, embodying the principles and attaining the advantages of the present invention. Since various matters of combination, proportion, procedure and detail may be modified without departing from the underlying principles it is not intended to limit the invention to such matters except in so far as specified in the appended claims.

What is claimed is:

1. The process of manufacturing cement comprising crushing acidic rocks containing substantial alkaline contents, drying the same under a heat of about 200° to 500° C., pulverizing the same to an impalpable condition, finer than commercial Portland cement, and intimately mixing the same with Portland cement containing silica in preponderance over alumina.

2. The process of manufacturing cement comprising crushing quartziferous rocks containing substantial alkaline contents, drying the same under a heat of 200° to 500° C., pulverizing the same to an impalpable condition, finer than commercial Portland cement, and subsequently intimately mixing the same with Portland cement containing silica in preponderance over alumina.

3. A quartz cement comprising quartziferous rocks containing substantial alkaline contents the same thoroughly heat-dried and pulverized to an impalpable condition, finer than commercial Portland cement, combined in intimate mixture with a slow setting Portland cement containing silica in preponderance over alumina.

In testimony whereof, I have affixed my signature hereto.

CELSO PIETRO BACCOVICH.